United States Patent [19]
Miller et al.

[11] Patent Number: 5,661,891
[45] Date of Patent: Sep. 2, 1997

[54] METHOD OF PASSING WIRES THROUGH A FIREWALL USING TELESCOPING CONDUIT ASSEMBLY

[76] Inventors: Albert J. Miller, 7131 Wilson St.;
Eugene A. Miller, 7361 Garfield St., both of Hollywood, Fla. 33024;
William D. Greenbarg, 1054 N. North Lake Dr., Hollywood, Fla. 33019

[21] Appl. No.: 645,873

[22] Filed: May 14, 1996

Related U.S. Application Data

[62] Division of Ser. No. 162,502, Dec. 3, 1993, Pat. No. 5,560,397.

[51] Int. Cl.$^6$ ................................................. B23P 11/02
[52] U.S. Cl. ................................................. 29/453; 52/220.8
[58] Field of Search ........................... 52/220.8; 285/921, 285/907, 325, 304, 396; 403/345; 29/453, 434, 240; 254/134.3 R

[56] References Cited

U.S. PATENT DOCUMENTS

| | | | |
|---|---|---|---|
| 719,817 | 2/1903 | Kunze | 29/453 |
| 2,408,253 | 9/1946 | Diebold | 138/110 |
| 2,870,242 | 1/1959 | Wilkerson | 138/110 |
| 3,924,661 | 12/1975 | Bornhoffer | 138/110 |
| 4,175,593 | 11/1979 | Sack | 138/110 |
| 4,258,515 | 3/1981 | Owen | 138/110 |
| 4,646,486 | 3/1987 | Hauff | 52/1 |
| 4,745,717 | 5/1988 | Domigan | 52/220.8 |
| 5,079,389 | 1/1992 | Nelson | 174/48 |
| 5,174,077 | 12/1992 | Murota | 52/220.8 |
| 5,442,885 | 8/1995 | Laven et al. | 29/453 |

FOREIGN PATENT DOCUMENTS 509970 10/1992 European Pat. Off. ........... 285/921

*Primary Examiner*—David P. Bryant
*Attorney, Agent, or Firm*—Lott & Friedland

[57] ABSTRACT

A conduit assembly which has an inner sleeve and outer sleeve which are proportioned to be concentrically mounted, each of which has a longitudinal slot of approximately the same width is disclosed. The conduits are circular, and a detent is provided on the larger of the conduits to accept and nestingly receive the slot of the smaller conduit when the same is rotated to form a complete circular encasement of the wires or cables which are passed through the conduits. The method of the invention contemplates the steps of forming a hole through a wall, such as a firewall, thereafter, optionally, passing the wires through, or passing the inner and outer sleeve through, and then once the wires are in place, or in anticipation of the wires being inserted, rotating the inner sleeve within the outer sleeve until the sleeve slots are approximately diametrically opposed and the central sleeve slop is secured in the detent. After the wires are in place interiorly of the conduit, a packing is inserted through the conduit assembly. Thereafter a blow out patch is secured to the exterior portion of the firewall on both side, and receives the end of the conduit assembly. The blow out patch, in turn, is secured to the firewall making a complete installation in which there are voids are minimized, which voids could pass smoke, fire, fumes, or other undesirables.

3 Claims, 2 Drawing Sheets

5,661,891

METHOD OF PASSING WIRES THROUGH A FIREWALL USING TELESCOPING CONDUIT ASSEMBLY

CROSS-REFERENCE TO RELATED APPLICATION

The present application is a divisional of application Ser. No. 08/162,502 filed Dec. 3, 1993 by the same inventors herein, entitled "Firewall Conduit and Method", now U.S. Pat. No. 5,560,397.

FIELD OF THE INVENTION

The present invention is directed to primarily passing electrical wires through a firewall after the firewall has been erected. The invention is also directed to the method of passing the conduit through the firewall and securing the wires in place.

BACKGROUND OF THE INVENTION

The prior art is well represented by Nelson U.S. Pat. 5,079,389. It uses a wire guard for use through a stud. It is a split coupling. It does not teach the method of being able to take wires which are already in through the wall and position a safety conduit around them and then sealingly lock the same in place. Other patents, such as Hauff U.S. Pat. No. 4,646,486, show a feed through fitting for a flame retardant wall. Similarly, Sack U.S. Pat. 4,175,593 discloses a duct for placement over an existing cable run. The Searer design patent 231,769 also shows a wire protector tube that is split to accept laying of wires. Finally, the Domigan U.S. Pat. No. 4,745,717 shows a poke through type passage of wires through a concrete floor. The subject matter is generally found in classes 138, 254, 16/2, 100, and class 174. The art appears elsewhere in various constructions publications.

While we would all like to believe that construction methods in large buildings are foolproof, oftentimes wiring projects, communications projects, and others are run through a building and through a firewall with one single hole passed through the firewall but not with the firewall-type code protection which requires a conduit of code diameter penetrating the wall and extending some distance, normally one inch, and a blow out patch on either side. When such a firewall penetration is discovered, building code supervisors and others demand an immediate fix. It is possible to go in and split a tube, but even when the tube is split, there is no 360° encapsulation of the conduit. Moreover, there needs to be a retrofit-type technique for passing the conduit of code thickness, encapsulating the conduit within the master conduit, and placing the blow out patch in position as well as caulking with appropriate fire proofing interiorly of the conduit through the wall, and exteriorly at the blow out patch.

SUMMARY OF THE INVENTION

The resent invention involves a conduit assembly which has an inner sleeve and outer sleeve which are proportioned to be concentrically mounted, each of which has a longitudinal slot of approximately the same width. The conduits are circular, and a detent is provided on the larger of the conduits to accept and nestingly receive the slot of the smaller conduit when the same is rotated to form a complete circular encasement of the wires or cables which are passed through the conduits. The method of the invention contemplates the steps of forming a hole through a wall, such as a firewall, thereafter, optionally, passing the wires through, or passing the inner and outer sleeve through, and then once the wires are in place, or in anticipation of the wires being inserted, rotating the inner sleeve within the outer sleeve until the sleeve slots are approximately diametrically opposed and the central sleeve slop is secured in the detent. After the wires are in place interiorly of the conduit, a packing is inserted through the conduit assembly. Thereafter a blow out patch is secured to the exterior portion of the firewall on both side, and receives the end of the conduit assembly. The blow out patch, in turn, is secured to the firewall making a complete installation in which there are voids are minimized, which voids could pass smoke, fire, fumes, or other undesirables.

A principal object of the present invention is to provide a method for securing walls wired safely through a firewall even if the wires have been passed through a wall for some time and a retrofitting conform to safety standards is required.

Another object of the present invention is to provide a simple set of sleeves which can form conduit assemblies of various diameters and varying lengths to secure wires and cables passing through the fire walls.

A further object of the present invention is to provide a simple assembly which can be passed through an existing wall, and when passed through the wall and secured, form a secured fire break for the conduit.

BRIEF DESCRIPTION OF THE DRAWINGS

The present invention will be further understood as illustrative embodiment proceeds, taken in conjunction with the accompanying drawings in which.

DESCRIPTION OF PREFERRED EMBODIMENT

Figure 1:
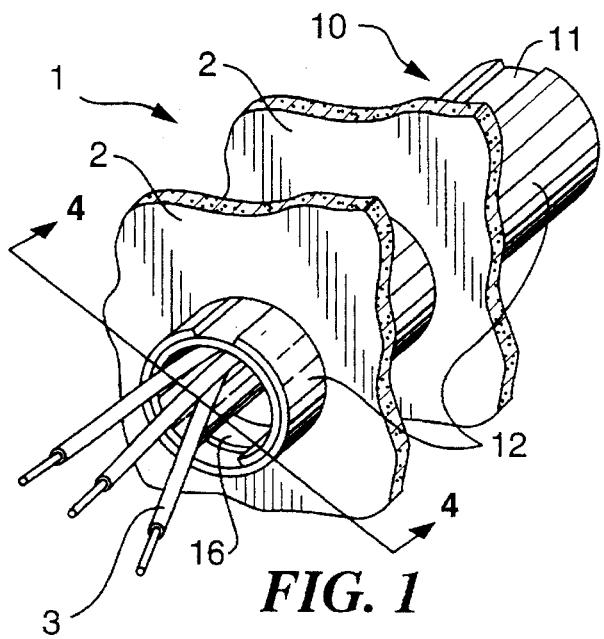
FIG. 1 is an assembly view somewhat diagrammatically showing wires, a wall, and the subject conduit in place.

As best shown in FIG. 1, it will be seen that the conduit assembly 10 has been passed through a firewall 1, and wires 2 have been passed through the assembly. A firewall hole is the medium whereby the wires are passed. The firewall hole 3 may have been in existence when the wall was erected, or it may be drilled when various installations are made in a building.

Figure 2:
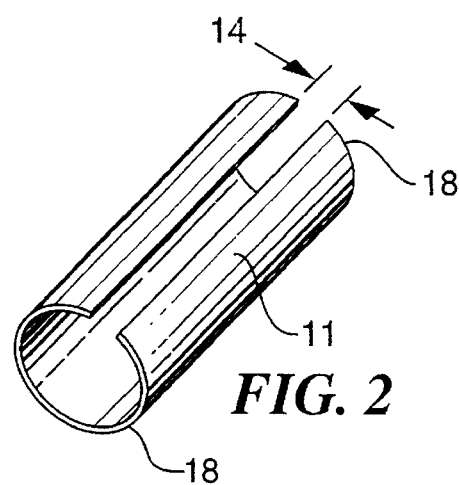
FIG. 2 is the inner sleeve of the conduit assembly.
Figure 4:
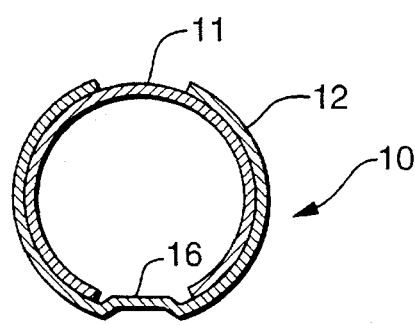
FIG. 4 is a transverse sectional view taken through section line 4—4 of FIG. 1 showing the relationship with the detent of the outer sleeve and the slot of the inner sleeve.

Turning now to FIG. 2, it will be seen that the inner sleeve 11 is a cylindrical conduit but with a longitudinal slot. Ideally the longitudinal slot is at least ⅜ to accommodate wires up to that thickness. Significantly larger slots may be used as will be explained later. The outside diameter of the inner sleeve 11 can vary between one inch and six inches. The two ends 18 of the inner sleeve 11 are normally transverse planes traversing the central longitudinal diameter of inner sleeve 11.

Figure 3:
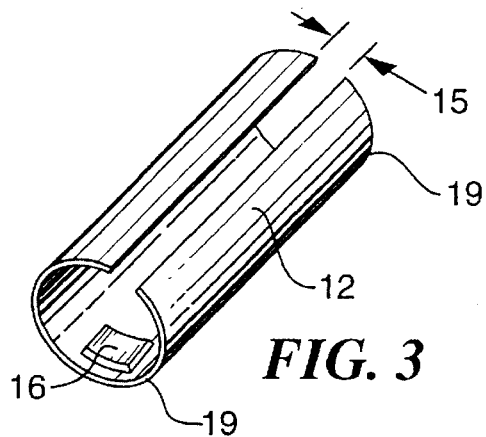
FIG. 3 is the outer sleeve of the conduit assembly.

The outer sleeve 12 illustrated in FIG. 3 has outer sleeves ends 19, and a slot 15. The slot 15 in the outer sleeves is preferably the same width as width of the slot 14 of the inner sleeve 11.

Figure 5:
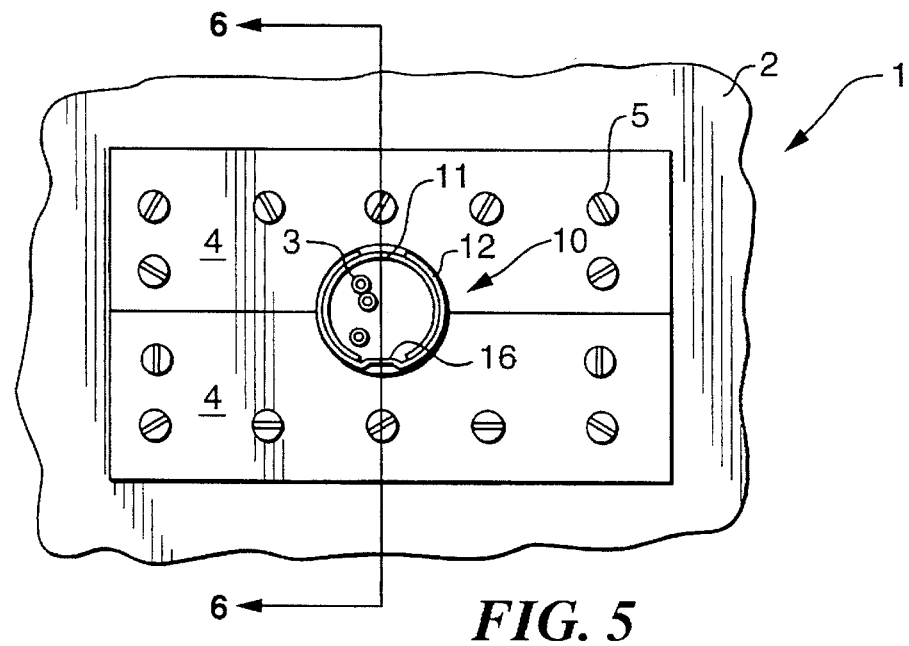
FIG. 5 is a front elevation of a blow out patch covering the assembly as shown in FIG. 1.
Figure 6:
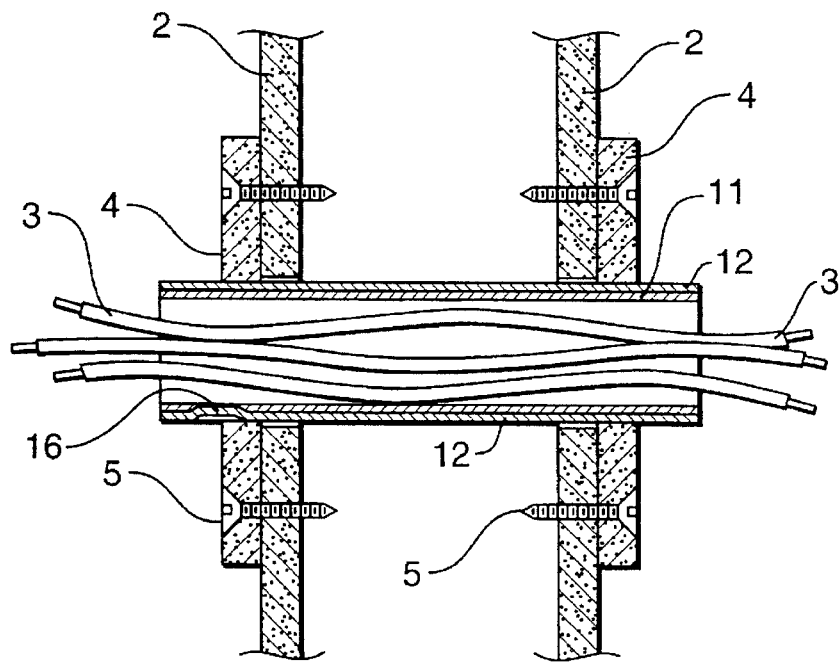
FIG. 6 is a transverse sectional view taken full length through the firewall illustrating the conduit assembly, the firewall, and the two blow out patches on either side of the firewall along with the extending tubular portion of the conduit assembly.
Figure 7:
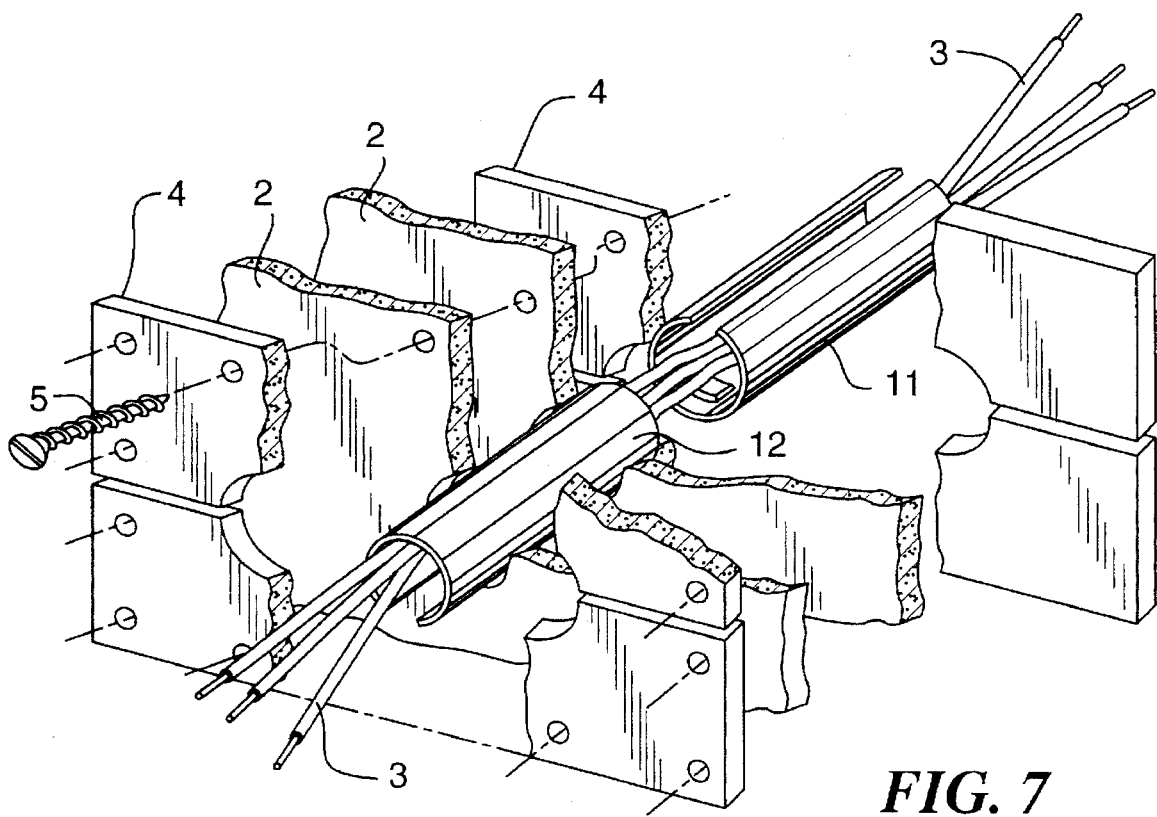
FIG. 7 is an exploded perspective view of the blow patch shown in FIG. 6.

The outer sleeve differs from the inner sleeve primarily in that its inner diameter is sufficient to accept the outer diameter of the inner sleeve 11. Additionally, however, a locking detent 16 is provided near one end 19 of the outer sleeve 12. The detent length is approximately ⅜ (or the width of the slot of the inner sleeve slot 14) so that when the inner sleeve is rotated within the outer sleeve, the detent 16 nests within the slot 14 of the inner sleeve and lockingly engages the same in the configuration as best shown in FIG. 1. A blow out patch 4 is illustrated in FIGS. 5 and 6 which receives the conduit assembly 10. The interior of the conduit assembly can be supplied with a packing (not shown). Further, there can also be a packing where the conduit assembly 10 penetrates the blowout patch. Finally, the blow out patch is sealed to the firewall.

While dimensions do not necessarily form a critical element of the invention, typical dimensions will illustrate typical proportions. Generally, various size coupling assemblies will be used. Typical examples are et forth below where diameter is involved. The length understandably is variable and need only be adequate to penetrate the firewall involved.

Generally speaking the original conduit assembly 10 will be a nominal ten foot length. Conduit assemblies 10 can then be struck to whatever lengths are necessary to penetrate the firewall. As to diameters, the conduit assembly can be a nominal interior diameter of one-half inch to six inches. Less than one-half inch would not give adequate space even for normal household wiring to be appropriately caulked and sealed. On the other hand, certain coaxial cables for heavy duty telephone systems or power systems can go as large as three or four inches. The slots in the assembly will be of sufficient width to pass whatever the wire or cable is to go interiorly of the conduit with sufficient tolerance so that it will not be scratched or cut while laying in through the longitudinal slot. In addition, to modularize the unit, the detent assembly 16 may be placed at six inch spacings. In this fashion irrespective of whether the conduit assembly is six inches or twelve inches there will be at least one detent assembly, and where the greater length is occurred augmented security results from the second detent.

As to specific details of the wall i it is normally made up of two panels of five eighths inch fire rated "sheet rock" shown as reference numeral 2 in FIGS. 1, 2, 6 and 7. It is also referred to as plaster board, gypsum panels, gypsum board, and is normally purchased at Home Depot or like builder supply locations in four foot by eight foot sheets. The blow out patch 4 is also sheet rock material. The blow out patch 4 is secured to the sheet rock wall portion 2 by "G" fastener screws. No pre-drilling is required. The "G" type gypsum to gypsum fastener screws are characterized by wide deep threads are self-starting. The number of such screws 5 is usually dictated by local building code, but as shown desirably in FIG. 5, they should be on nominal three inch spacing, and surround the peripheral portion of the upper and lower halves of the blow out patch 4. A thin coating of "joint compound" is applied as a skim coat to the back side of the blow out Patch 4 where it joins the wall portion 2.

The method:

The method of the present invention contemplates the utilization of an inner sleeve and outer sleeve 11, 12 to form a conduit assembly. The first step in forming the assembly is to penetrate a wall 1 with a hole 3 to the end that wires 2 can be passed through the wall 1. The wires may have been in place for some time prior to the utilization of the method.

The inner sleeve and outer sleeve 11, 12 can be utilized together with their two slots 14, 15 in alignment to thereby receive the wires 2 and then pass the conduit assembly 10 which is made up of the inner sleeve 11 and outer sleeve 10 through the wall 1 by traversing the hole 3 in the wall.

Once the wires 2 and the conduit assembly 10 are in the desired position in he wall 1, the inner sleeve is rotated against the outer sleeve until such time as the inner sleeve slot 14 engages the outer sleeve detent 16. Thereafter the unit is packed and caulked with traditional firewall materials.

Although particular embodiments of the invention have been shown and described in full here, there is no intention to thereby limit the invention to the details of such embodiments. On the contrary, the intention is to cover all modifications, alternatives, embodiments, usages and equivalents as fall within the spirit and scope of the present invention, specification and appended claims.

What is claimed is:

1. A method of passing a plurality of wires, connectors, or other members through a firewall comprising the steps of:

providing a conduit assembly which consists of an outer telescoping sleeve and an inner telescoping sleeve, said outer telescoping sleeve and said inner telescoping sleeve having an essentially cylindrical cross section with said outer telescoping sleeve having a slightly larger cross section than said inner telescoping sleeve, and said outer telescoping sleeve and said inner telescoping sleeve having essentially the same length and each having longitudinal slots of approximately the same width;

providing a hole through a firewall with a diameter slightly larger than the outer diameter of said outer telescoping sleeve;

aligning said longitudinal slots of said outer telescoping sleeve and said inner telescoping sleeve and passing said plurality of wires, connectors or other members therethrough;

rotating said inner telescoping sleeve within said outer telescoping sleeve until said slot of said inner telescoping sleeve is obstructed by said outer telescoping sleeve; and securing said conduit assembly within said hole in said firewall.

2. The method of passing a plurality of wires, connectors, or other members through a firewall of claim 1, further comprising the steps of:

forming a detent on one end of the inner portion of said outer telescoping sleeve; and rotating said inner telescoping sleeve until said detent is snuggly positioned in said longitudinal slot of said inner telescoping sleeve.

3. The method of passing a plurality of wires, connectors, or other members through a firewall of claim 1, further comprising the steps of:

securing a first blow out patch to said firewall where a first end of said conduit assembly protrudes through said firewall and securing a second blow out patch to said firewall where a second opposing end of said conduit assembly protrudes through said firewall.

* * * * *